United States Patent [19]
Ohmura

[11] 4,214,756
[45] Jul. 29, 1980

[54] RECORD PLAYER

[75] Inventor: Yoshimoto Ohmura, Mitaka, Japan

[73] Assignee: Sony Corporation, Tokyo, Japan

[21] Appl. No.: 26,341

[22] Filed: Apr. 2, 1979

[30] Foreign Application Priority Data

Apr. 3, 1978 [JP] Japan .................................. 53-38960

[51] Int. Cl.² ............................................. G11B 3/10
[52] U.S. Cl. ................................ 274/23 R; 274/13 R
[58] Field of Search ...................... 274/13 R, 14, 15 R, 274/23 R, 23 A

[56] References Cited

U.S. PATENT DOCUMENTS

| 3,492,006 | 1/1970 | Shimoda et al. | 274/23 R |
| 3,779,563 | 12/1973 | Irisana | 274/23 R |
| 3,937,476 | 2/1976 | Sakai | 274/23 R |
| 4,076,258 | 2/1978 | Wren | 274/23 R |
| 4,132,935 | 1/1979 | Gans et al. | 274/15 R |
| 4,138,121 | 2/1979 | Nakajima et al. | 274/23 R |

FOREIGN PATENT DOCUMENTS

| 2506299 | 8/1976 | Fed. Rep. of Germany | 274/23 R |
| 2818884 | 11/1978 | Fed. Rep. of Germany | 274/13 R |
| 1533843 | 11/1978 | United Kingdom | 274/13 R |

Primary Examiner—John W. Shepperd
Attorney, Agent, or Firm—Lewis H. Eslinger; Alvin Sinderbrand

[57] ABSTRACT

A record player includes an electro-magnetic member for applying to its tone arm an outside force which is varied to effectively cancel the inside force generated when the stylus located on the tone arm rides upon a rotating record disc. The record player further includes a detecting device for detecting the rotational position of the tone arm, and a computer which, as a function of the rotational position of the tone arm determined from a detecting signal supplied by the detecting device, generates an outside force control voltage which is sufficient, when supplied to the electro-magnetic member, to cancel the inside force. An additional electro-magnetic member may be used to apply a stylus pressure to the tone arm in response to a stylus pressure control voltage. The outside force control voltage may also be varied as a function of such a stylus pressure control voltage.

6 Claims, 3 Drawing Figures

RECORD PLAYER

BACKGROUND OF THE INVENTION

1. Field of the Invention

This invention relates to a record player which compensates for the inside force generated when the stylus located on the record player's tone arm rides upon a rotating record disc.

2. Description of the Prior Art

In a record player having a tone arm with an off-set angle, it is well known that during rotation of a record disc a force toward the center of the record disc, the so called "inside force", is applied to a reproducing stylus of a pickup cartridge as the result of the coaction of a frictional force between the reproducing stylus and a sound groove of the record disc and a reaction force to the frictional force due to the offset angle of the tone arm. The inside force varies with the reproducing position of the stylus on the record disc. It is larger on the outer and inner grooves of the record disc, while it is smaller on the intermediate grooves of the record disc. Further, it is known that the inside force depends on the stylus pressure of the pick-up cartridge. The higher the stylus pressure, the larger the inside force.

Various apparatus have been proposed to cancel the above-described inside force. For example, in the previous apparatus for cancelling inside force which have mechanical construction, a weight is generally used for applying to a tone arm a force toward the outer periphery of a record disc, namely an outside force to cancel the inside force. The weight is suspended through a string from a pin fixed to the tone arm. Frictional force between the pin and the string is considerable. Accordingly, the inside force cannot be accurately compensated. Further, the inside force varies with the stylus pressure. Thus when the stylus pressure is changed the condition of the weight suspension or the weight should also be adjusted. Such an operation is very inconvenient.

Recently, instead of the mechanical apparatus for cancelling inside force, there has been an apparatus using electro-magnetic force. A typical apparatus of such a kind was disclosed in the U.S. Pat. No. 4,076,258. In this apparatus, inside force can be cancelled by the combination of a permanent magnet and a coil without applying frictional force to a tone arm. This apparatus is advantageous. However, it is not suggested in the above U.S. patent that an outside force should be accurately varied in accordance with the reproducing position of the stylus on the record disc.

SUMMARY OF THE INVENTION

An object of this invention is to provide a record player in which an electro-magnetic means is coupled with a tone arm to cancel an inside force.

Another object of this invention is to provide a record player in which inside force can be cancelled without mechanical friction.

A further object of this invention is to provide a record player in which the position of the reproducing stylus of a cartridge is detected, and an outside force sufficient to cancel the inside force can be produced in accordance with that detection.

A still further object of this invention is to provide a record player in which the strength of a force used to cancel the inside force can be automatically varied as a function of a change of stylus pressure.

A still further object of this invention is to provide a record player which is simple in construction and can be conveniently handled.

In accordance with an aspect of this invention, a record player includes a tone arm movable in the horizontal direction and vertical direction with respect to a record disc, having a stylus at its one end. The record player further includes a first electro-magnetic means connected to the tone arm for applying a horizontal force to the tone arm in an amount corresponding to a control voltage supplied to the first electro-magnetic means; detecting means for detecting the horizontal position of the tone arm and for supplying a detecting output which varies as such horizontal position changes; means responsive to the detecting output for generating an outside force voltage, the magnitude of which varies in dependence upon the horizontal position of the tone arm and means for supplying the outside force voltage as said control voltage to the first electro-magnetic means. The generating means produces the outside force voltage in a magnitude sufficient, when supplied to the first electro-magnetic means, to apply a horizontal force to the tone arm that cancels the inside force generated when the stylus of said tone arm rides upon a rotating record disk.

Other objects, features, and advantages of the present invention will be apparent from the following description taken in conjunction with the accompanying drawings.

DESCRIPTION OF THE PREFERRED EMBODIMENT

Next, one embodiment of this invention will be described with reference to the drawings.

Figure 1:
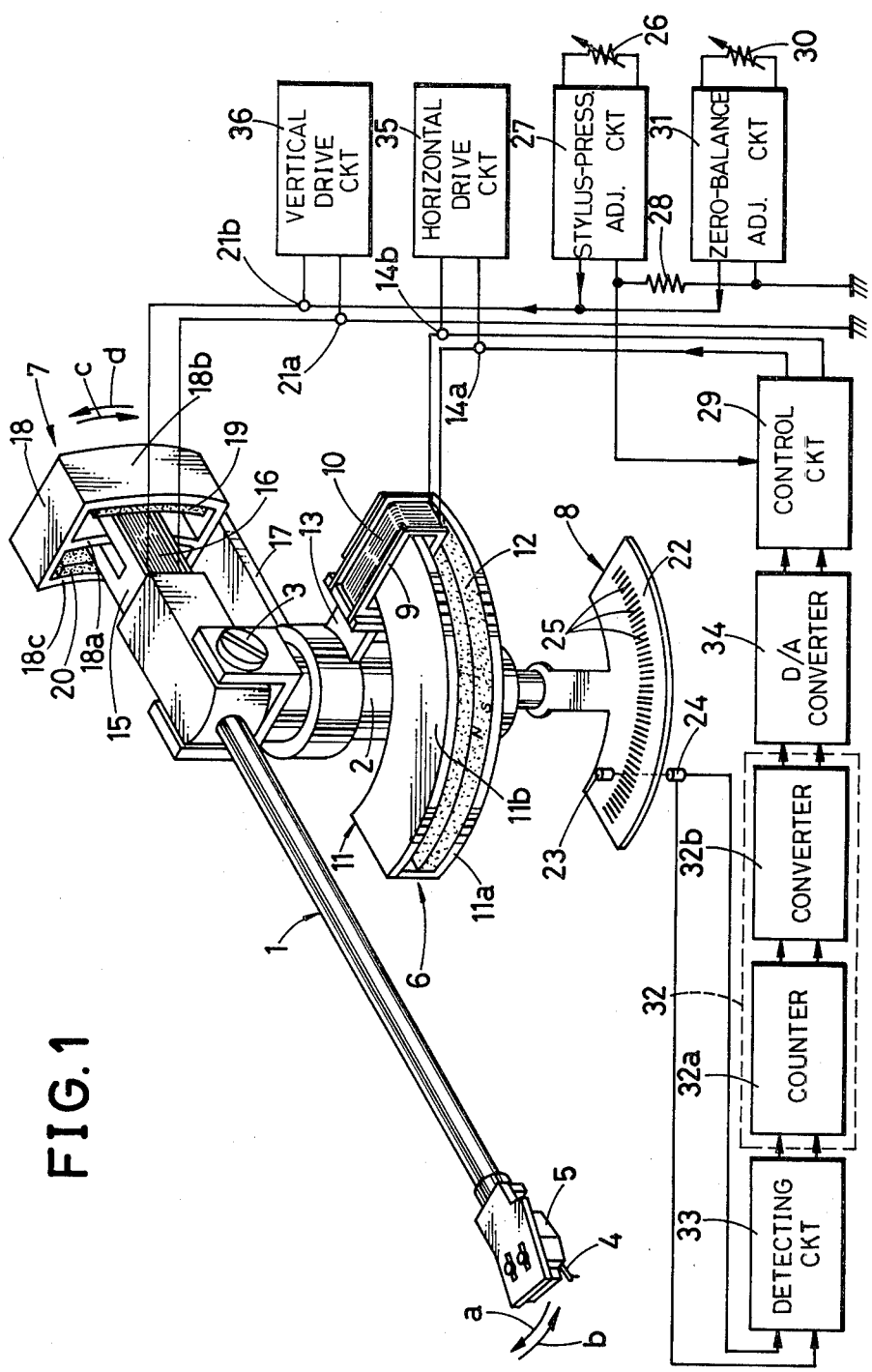
FIG. 1 shows a perspective view of a tone arm of a record player and a block diagram of the control circuitry for the tone arm, according to one embodiment of this invention.

Referring to FIG. 1, a tone arm 1 is so supported by an arm shaft 2 as to be rotatable in the horizontal direction, shown by the arrows a and b, with respect to a record disc (not shown), and it is so supported by a pivotal mechanism 3 as to be rotatable in the vertical direction, shown by the arrows c and d, with respect to the record disc. A cartridge 5, having a reproducing stylus 4, is mounted on a top end of the tone arm 1. Further, a horizontal control motor 6 which functions as a first electromagnetic means, a vertical control motor 7 which functions as a second electro-magnetic means, and a horizontal position detector 8 are provided for the tone arm 1.

The horizontal control motor 6 is constituted by a rotor consisting of a bobbin 9 and a coil 10 wound on the bobbin 9, and a stator consisting of a yoke 11 and an arcuate permanent magnet 12. The bobbin 9 is fixed to a top end of a rotary arm 13, which is fixed to a part of the arm shaft 2. The yoke 11 is in an arc shape which is concentric with the arm shaft 2, and it is fixed to the chassis of the record player by suitable means. The arcuate permanent magnet 12 magnetized in the direction of its thickness is fixed on a lower part 11a of the yoke 11 by adhesive. The bobbin 9 is slidably fitted around an upper part 11b of the yoke 11, spaced by a predetermined distance from the permanent magnet 12. Terminals 14a and 14b are led out from the coil 10.

The vertical control motor 7 is constituted by a rotor consisting of a bobbin 15 and a coil 16 wound on the bobbin 15, and a stator consisting of a yoke 18 fixed to a top end of a support arm 17 fixed to the arm shaft 2, and a pair of arcuate permanent magnets 19 and 20. The yoke 18 is in the rectangular form. A vertical yoke portion 18a is formed in the center of the yoke 18, and it is in the arcuate shape which is concentric with the axis of the pivotal mechanism 3. The magnets 19 and 20 are so fixed on the inner surfaces of side portions 18b and 18c of the yoke 18 by adhesive that the polar surfaces of the same polarity face toward each other. The bobbin 15 is rotatably fitted to the vertical yoke portion 18a functioning as a guide, spaced by a predetermined distance from the magnets 19 and 20. Terminals 21a and 21b are led out from the coil 16.

The horizontal position detector 8 consists of a slit plate 22 fixed to the arm shaft 2, a light-emitting element 23 such as a lamp, and a light-sensitive element 24 such as CdS (cadmium sulfide). The light emitting element 23 and the light-sensitive element 24 face each other through the slit plate 22. Numerous slits 25 are formed in the slit plate 22 on a circle which is concentric with the arm shaft 2. When the tone arm 1 is rotated from its arm rest position in the horizontal direction together with the slit plate 22, the slits 25 pass directly above the light-sensitive element 24, and light from the light-emitting element 23 is intermittently intercepted by the slit plate 22. Pulses are obtained from the light-sensitive element 24. The number of the pulses corresponds to the rotational angle of the tone arm 1.

The tone arm 1 can be moved in the horizontal direction, shown by the arrows a and b, by the horizontal control motor 6 and in the vertical direction, shown by the arrows c and d, by the vertical control motor 7. A control voltage is supplied through the terminals 14a and 14b to the coil 10 of the horizontal control motor 6 from a horizontal drive circuit 35 to energize the coil 10. A current flowing through the coil 10 intersects with magnetic flux flowing from the magnet 12 to impart a horizontal torque to the coil 10 and thereby to drive the tone arm 1 in the horizontal direction. Another control voltage is supplied through the terminals 21a and 21b to the coil 16 of the vertical control motor 7 from a vertical drive circuit 36 to energize the coil 16. A current flowing through the coil 16 intersects with magnetic flux flowing from the magnets 19 and 20 to impart a vertical torque to the coil 16 and thereby to drive the tone arm 1 in the vertical direction. The horizontal drive circuit 35, the horizontal control motor 6, the vertical drive circuit 36 and the vertical control motor 7 constitute a servo system for the tone arm 1. The position and moving speed of the tone arm 1 can be servo-controlled by the servo system.

The output of a stylus-pressure adjusting circuit 27 is controlled by a stylus-pressure adjusting resistor 26, and is supplied through the terminal 21b to the coil 16 to energize the coil 16. A current flowing through the coil 16 intersects with magnetic flux flowing from the magnets 19 and 20 to impart a force to the coil 16 in the direction d. Accordingly, a desired pressure is imparted to the reproducing stylus 4. Further, the output of the stylus-pressure adjusting circuit 27 is supplied to a control circuit 29. An output voltage of a zero-balance adjusting circuit 31 is controlled by a zero-adjusting resistor 30, and supplied through the terminal 21b to the coil 16 to balance the tone arm 1 at its upper position. A control signal is obtained from the control circuit 29 which varies as a function of the output voltage of the stylus-pressure adjusting circuit 27. The horizontal control motor 6 can be controlled either by the output of the control circuit 29 or, the output of the horizontal drive circuit 35.

Pulses produced in response to the rotation of the tone arm 1 are supplied to a detecting circuit 33 from the light-sensitive element 24 of the position detector 8. Pulsated output from the detecting circuit 33 is supplied to a micro-computor 32 which includes a counter 32a and a convertor 32b. The counter 32a counts the number of the pulses supplied from the detecting circuit 33. The convertor 32b produces a code corresponding to a voltage which will be sufficient, when applied to motor 6, to cancel the inside force. This code varies as a function of the position of the reproducing stylus 4, as determined from the detecting output of the detecting circuit 33. The coded digital output of the micro-computor 32 is supplied to a D/A converter 34. The digital signal is converted into a analogue signal by the D/A converter 34, and the analogue signal is supplied to the control circuit 29. Since the output of the stylus-pressure circuit 27 is further supplied to the control circuit 29, a control voltage which varies in accordance with the stylus pressure and horizontal position of tone arm 1 is supplied from the control circuit 29 to the coil 10 of the horizontal control motor 6.

Next, the operation of the above-described construction will be described.

The stylus 4 of the tone arm 1 is moved onto the record disc to play the record. The tone arm 1 rotates in the direction a with the rotation of the record disc. In that condition, a voltage for stylus pressure in accordance with the adjustment of the resistor 26 is applied to the coil 16 of the vertical control motor 7 from the stylus-pressure adjusting circuit 27 to energize the latter. A current flowing through the coil 16 intersects with magnetic flux flowing from the magnets 19 and 20 to impart a torque to the coil 16 in the direction d. Thus, while the tone arm 1 rotates in the horizontal direction, a predetermined pressure is applied to the reproducing stylus 4.

Figure 2:
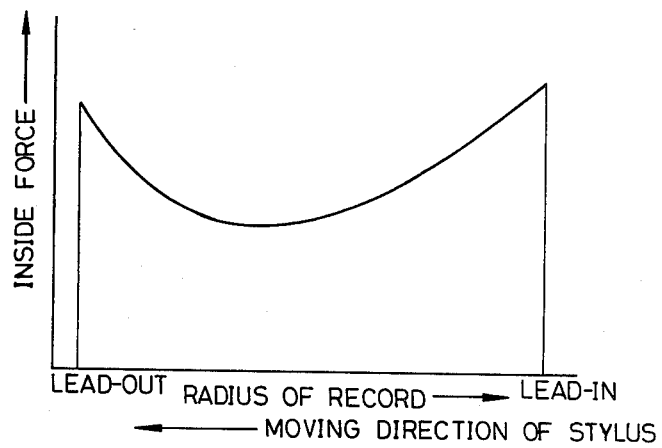
FIG. 2 is a graph showing the relationship between the position of the reproducing stylus on the record disc and the inside force.

On the other hand, the slit plate 22 rotates in the direction a together with the tone arm 1. Pulses are obtained from the light-sensitive element 24 as a result of the rotation of the slit plate 22, and are detected by the detecting circuit 33. The number of the pulses supplied from the detecting circuit 33 is counted by the counter 32a in the micro-computer 32. The output of the counter 32a is supplied to the converter 32b. A code signal in accordance with the position of the reproducing stylus 4 is produced by the converter 32b. The code signal has a digital value corresponding to a voltage which will be sufficient, when applied to motor 6, to cancel the inside force. As the result, an analogue signal, as shown in FIG. 2, is obtained from the D/A converter 34, and it is supplied to the coil 10. The current flowing through the coil 10 intersects with magnetic flux flowing from the magnet 12 to impart a force in the direction b, namely an outside force, to the reproducing stylus 4. Further, since the output voltage of the stylus-pressure adjusting circuit 27 is applied to the control circuit 29, the control voltage for cancellation of inside force generated by control circuit 29 also varies in responce to the stylus pressure, as shown in FIG. 3.

Figure 3:
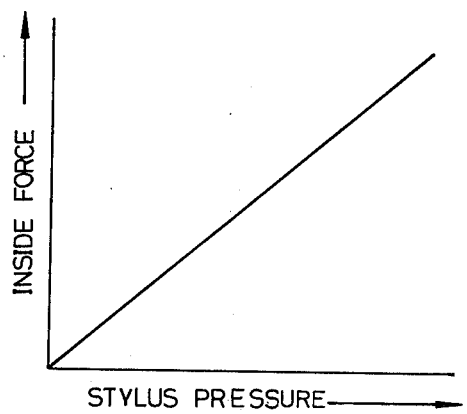
FIG. 3 is a graph showing the relationship between the stylus pressure and the inside force.

Although the graphs of FIG. 2 and FIG. 3 show the strength of inside force, they can also be considered to show the strength of outside force which is required to compensate for such inside force.

This invention is directed to a record player in which an outside force sufficient to cancel an inside force is applied to a tone arm by an electro-magnetic means such as a horizontal control motor 6. Further, according to this invention, a pressure is applied to a reproducing stylus of the tone arm by another electro-magnetic means such as a vertical control motor 7, and the first mentioned electro-magnetic means for producing the outside force is controlled as a function of a voltage for stylus-pressure adjustment which is applied to the other electro-magnetic means.

According to this invention, the inside force compensating apparatus is stable in operation in comparison with the conventional mechanical compensating apparatus, and a compensating force for an inside force can be accurately controlled, and further automatically controlled in responce to a stylus pressure which affects the inside force. Further, it can be controlled in responce to the position of the reproducing stylus, for example, by using a micro-computor.

Although the illustrative embodiment of the invention has been described in detail herein with reference to the accompanying drawings, it is to be understood that the invention is not limited to the precise embodiment, and that various changes and modifications can be effected therein by one skilled in the art without departing from the scope and spirit of the invention as defined in the appended claims.

What is claimed is:

1. A record player comprising:
   a tone arm movable in the horizontal direction and vertical direction with respect to a record disc and carrying a reproduction stylus at one end of said tone arm;
   first electro-magnetic means coupled with said tone arm for applying a horizontal force to said tone in an amount corresponding to the magnitude of a control voltage supplied to said first electro-magnetic means;
   detecting means for detecting the horizontal position of said tone arm and for supplying a detecting output which varies as said horizontal position changes;
   generating means responsive to said detecting output for generating an outside force voltage, the magnitude of which varies in dependence upon the horizontal position of said tone arm; and
   means for supplying said outside force voltage as said control voltage to said first electro-magnetic means, said generating means producing said outside force voltage in a magnitude sufficient, when supplied to said first electro-magnetic means, to apply a horizontal force to said tone arm that effectively cancels the inside force generated when the stylus of said tone arm rides upon a rotating record disc.

2. A record player according to claim 1, in which said detecting means supplies a number of pulses as said detecting output, the number of which pulses varies in accordance with the horizontal position of said tone arm, and in which said generating means comprises a counting circuit for counting the number of pulses supplied from said detecting means, a code generating circuit for generating a digital code signal which corresponds to said inside force and which depends on the horizontal position of said tone arm as indicated by the output of said counting circuit, and a converting circuit for converting said digital code signal into an analogue signal.

3. A record player according to claim 1, in which said first electro-magnetic means comprises a coil connected to said tone arm and a permanent magent for generating magnetic flux across said coil.

4. A record player according to claim 3, further comprising a horizontal drive circuit for driving said tone arm in the horizontal direction, and in which DC voltages are separately supplied as control voltages to said coil from said horizontal drive circuit and said generating means, respectively.

5. A record player according to claim 1, further comprising means for changing stylus-pressure which includes second electro-magnetic means coupled with said tone arm for applying a vertical force to said tone arm and a stylus-pressure adjusting circuit for supplying a DC voltage to said second electro-magnetic means, and a circuit for supplying the output of said stylus-pressure adjusting circuit as a control input to said generating means.

6. A record player according to claim 1, in which said detecting means comprises a slit plate having numerous slits and fixed on said tone arm, a light-emitting element and a light-sensitive element, said light-emitting element and said light-sensitive element being placed across said slit plate from each other.

* * * * *